US012183183B2

(12) United States Patent
de Lorenzo

(10) Patent No.: US 12,183,183 B2
(45) **Date of Patent: *Dec. 31, 2024**

(54) PROCESSING ALERT SIGNALS FROM POSITIONING DEVICES

(71) Applicants: AIRISTA Flow, Inc., Sparks Glencoe, MD (US); AIRISTA International Oy, Helsinki (FI)

(72) Inventor: Renato Francesco de Lorenzo, Helsinki (FI)

(73) Assignees: Airista Flow, Inc., Newark, DE (US); Airista International Oy, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,929

(22) Filed: Jul. 25, 2023

(65) Prior Publication Data

US 2023/0368641 A1 Nov. 16, 2023

Related U.S. Application Data

(63) Continuation of application No. 16/862,007, filed on Apr. 29, 2020, now Pat. No. 11,721,197, which is a continuation of application No. 16/164,997, filed on Oct. 19, 2018, now Pat. No. 10,657,793, which is a continuation of application No. 13/865,538, filed on Apr. 18, 2013, now Pat. No. 10,152,874.

(51) Int. Cl.
*G08B 25/00* (2006.01)
*G08B 25/01* (2006.01)

(52) U.S. Cl.
CPC ......... *G08B 25/006* (2013.01); *G08B 25/016* (2013.01)

(58) Field of Classification Search
CPC ................ G08B 25/006; G08B 25/016; G08B 27/001; G08B 25/10; H04W 4/90
See application file for complete search history.

(56) References Cited

U.S. PATENT DOCUMENTS

| | | | |
|---|---|---|---|
| 5,949,866 | A | 9/1999 | Coiera et al. |
| 6,774,797 | B2 | 8/2004 | Freathy et al. |
| 7,299,059 | B2 | 11/2007 | Misikangas et al. |
| 10,152,874 | B2 | 12/2018 | de Lorenzo |
| 10,657,793 | B2 | 5/2020 | de Lorenzo |
| 2002/0002053 | A1 | 1/2002 | Nam et al. |

(Continued)

FOREIGN PATENT DOCUMENTS

| | | | |
|---|---|---|---|
| EP | 1796419 | A1 | 6/2007 |
| WO | 02054813 | A1 | 7/2002 |

(Continued)

*Primary Examiner* — Vernal U Brown
(74) *Attorney, Agent, or Firm* — Harter Secrest & Emery LLP; Timothy W. Menasco, Esq.

(57) ABSTRACT

A method for a positioning server configured to locate positioning devices and to maintain information on users, who are associated with respective positioning devices. The server receives one or more alert messages from an alerting positioning device. Each alert message conveys identifying information of the alerting positioning device. The server uses the identifying information to retrieve a location estimate of the alerting positioning device. The server forms a first set of other positioning devices in a vicinity of the alerting positioning device and sends an assist request message to the positioning devices in the first set. The assist request message indicates the location estimate of the alerting positioning device and/or said descriptive information.

11 Claims, 4 Drawing Sheets

(56) References Cited

U.S. PATENT DOCUMENTS

| | | | |
|---|---|---|---|
| 2005/0131635 | A1 | 6/2005 | Myllymaki et al. |
| 2005/0197139 | A1 | 9/2005 | Misikangas et al. |
| 2007/0247366 | A1 | 10/2007 | Smith et al. |
| 2013/0115872 | A1 | 5/2013 | Huang et al. |

FOREIGN PATENT DOCUMENTS

| | | | |
|---|---|---|---|
| WO | 03102622 | A1 | 12/2003 |
| WO | 2004008795 | A1 | 1/2004 |
| WO | 2004008796 | A1 | 1/2004 |
| WO | 2008065257 | A1 | 6/2008 |

PROCESSING ALERT SIGNALS FROM POSITIONING DEVICES

FIELD OF THE INVENTION

The present invention relates to techniques for processing alert signals from positioning devices.

BACKGROUND OF THE INVENTION

Portable electronic devices are frequently used to track the location of persons and/or assets. Satellite positioning cannot be used inside most buildings, and indoor positioning systems are typically based on strength and/or quality observations of signals sent and/or received by the portable electronic devices. Alternatively or additionally, locally constrained radiation, such as infrared or short-range radio or microwave transmission, can be used to track the devices.

A number of reference documents, which are commonly-owned patent applications incorporated herein by reference, are listed at the end of this description. The reference documents disclose various techniques for estimating or determining a location of a positioning device. One of the reasons for locating a positioning device is send assistance to a user associated with the positioning device in cases wherein the user requests assistance by means of the positioning device. For instance, positioning devices may be provided with means to trigger an alert condition with a quick hand movement. In response to the alert condition, the positioning device sends an alert signal to the positioning system, or via the positioning system to an alert-processing system.

Some issues that are not fully resolved in the past relate to determination of which persons should be instructed to give assistance to the alerting user. Further non-resolved issues relate to determination whether or not the instruction to give assistance was received and acted on by at least one user able to give assistance, and what should be done if the instruction was not received or acted on.

SUMMARY OF THE INVENTION

An object of the present invention is to alleviate one or more problems in the prior art. The object is achieved by aspects of the invention as claimed in the attached independent claims. The dependent claims and the following detailed description and the associated drawings relate to specific embodiments or implementations which provide additional benefits and/or solve residual problems.

An aspect of the present invention is a method performed by a data processing apparatus, which comprises or cooperates with a positioning server system configured to manage a database system storing a respective location estimate for each of several positioning devices and to maintain descriptive information on each of several users, each of whom is associated with a respective positioning device. The method comprises:

- receiving one or more alert messages from an alerting positioning devices, wherein each alert message conveys identifying information of the alerting positioning device that sent the one or more alert messages;
- using the identifying information conveyed in the at least one alert message to retrieve from the database system a location estimate of the alerting positioning devices;
- determining a first set of other positioning devices in a vicinity of the alerting positioning device; and
- sending an assist request message to each of the positioning devices in the first set of other positioning devices, wherein the assist request message indicates the location estimate of the alerting positioning device and/or said descriptive information on the user associated with the alerting positioning device.

The word “system” in connections like “server system”, “database system”, “memory system”, or the like, means that the system may comprise one or more of the respective elements (servers, databases, memories, and so on).

The expression “data processing apparatus, which comprises or cooperates with a positioning server system, . . . ” means 1) that the data processing apparatus which performs steps a) through d) may be integrated with the positioning server which manages a database of location estimates for the positioning devices, or 2) that the data processing apparatus is distinct from the positioning server, as long as the data processing apparatus is able to retrieve the location estimates from the database managed by the positioning server.

The phrase “descriptive information on each of several users” means, at a minimum, that the users of the positioning device can be identified at least as members of a class, such as security, nurse, doctor, patient, administration, or the like. In some implementations the data processing apparatus may internally process descriptive information which uniquely identifies each user, while a normal operator without administrative rights may only see the users as members of their respective classes.

The phrase “identifying information of the alerting positioning device” means that the positioning device that sends the alert message can be uniquely identified, regardless of whether a normal operator can see the actual identity of the alerting user. “The alerting positioning device” is a shorthand notation for “the positioning device that sent the alert message”.

The phrase “a first set of other positioning devices in a vicinity of the at least one alerting positioning device” means one or more positioning devices whose users, by virtue of their location with respect to the alerting positioning device, are better than average candidates for giving assistance to the user of the alerting positioning device. In borderline cases there may be only one candidate user, or all users may be considered equally good candidates, in which case the first set may consist of average candidates.

In some embodiments, the determination of the first set of positioning devices comprises considering at least one and preferably two or more of a set of factors for a number of candidate positioning devices. The set of factors comprises:

- an estimated distance and/or an estimated travel time from the location estimate of the candidate positioning device to the location estimate of the alerting positioning device;
- a first ranking relating to the user associated with the respective candidate positioning device, wherein the ranking is based on the user's ability to give assistance;
- a second ranking relating to the user associated with the alerting positioning device.

In the present context, the “estimated distance from the location estimate of the candidate positioning device to the location estimate of the alerting positioning device” means distance as maintained by the positioning server system. In some implementations the location estimates are maintained as multidimensional coordinates, in which case a simple vector from the candidate's location to the alerting user's location may constitute the estimated distance. Because such simple vectors may penetrate walls and other obstacles, they do not accurately indicate actual distances to be traveled.

US2005/197139 (WO2004/008795) discloses location-determination techniques which use graphs that model the topology of the target object's communication environment. These techniques can be used to obtain estimated distances that are more accurate than simple vectors.

As regards the "estimated travel time from the location estimate of the candidate positioning device to the location estimate of the alerting positioning device", the travel time, to the extent that it can be determined, is likely to be a better criterion than the corresponding distance because the travel time directly indicates how quickly a candidate user can reach the site of the alerting user. The travel time can be estimated by considering the candidate user's distance from the alerting user, as described above, plus the speed of the respective user. The speed can be assumed equal for all users or all users in a given class. For instance, security officers can be assumed faster than doctors. U.S. Pat. No. 7,299,059 (EP1796419) discloses comprehensive techniques for modeling target object movement, including motion models, which can be used to obtain real-time motion data of the users of the positioning devices. It can be assumed that in case of emergency, a candidate user can move approximately at the top speed indicated by the motion model.

A simpler technique for determining the estimated distance and/or an estimated travel time is to maintain a set or hierarchy of zones, zone groups, floors and/or buildings. An alert-processing server can rank candidates in the same zone as the alerting tag higher than average candidates. If the number of candidates in the zone of the alerting tag is smaller than some threshold number, the search for candidates can extend to neighboring zones and/or to a higher hierarchical level. For instance, the search can be extended from a zone to a zone group or from a floor to a building, and so on.

Determination of the first set of positioning devices, to which the assist request message is sent, can take into account a ranking of the positioning devices' users with respect to the ability of the users to give assistance. For instance, the data processing system may be configured to consider a security officer 50 meters from the alert site a better candidate than a housekeeping assistant 20 meters from the site.

Alternatively or additionally, the determination of the first set of positioning devices, to which the assist request message is sent, can take into account a second ranking relating to the user associated with the alerting positioning device. For instance, if the alerting user is a patient, and particularly if the patient has a potentially fatal condition, the second ranking may be used to favor medical personnel over security guards, in construction of the first set of positioning devices, to which the assist request message is sent.

The factors, such as distance or time from each candidate's site to the alert site, the ability to give assistance and the alerting user's class (patient, invoicing officer, etc.) can be combined with weights, which may be configurable by an operator or administrator of the data processing apparatus.

In a case where an acknowledgment message is not received from a predetermined number of positioning devices in the first set, the method may comprise determining a second set of other positioning devices in the vicinity of the alerting positioning device, and sending a further assist request message to each of the positioning devices in the second set.

BRIEF DESCRIPTION OF THE DRAWINGS

In the following section, specific embodiments of the invention will be described in greater detail in connection with illustrative but non-restrictive examples. A reference is made to the following drawings.

DETAILED DESCRIPTION OF SOME SPECIFIC EMBODIMENTS

Figure 1:
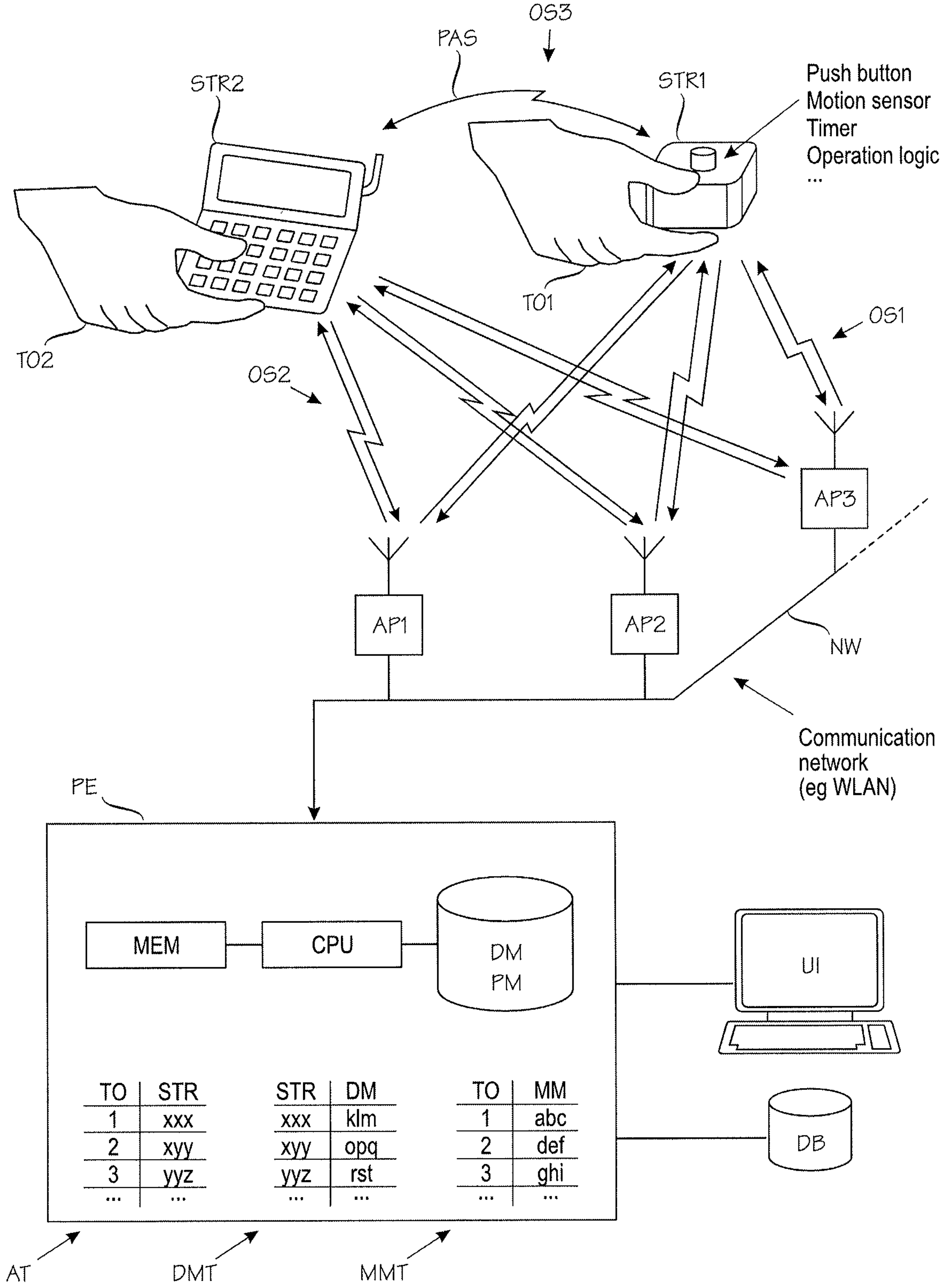
FIG. 1 schematically depicts a practical implementation of the invention.

FIG. 1 schematically depicts one of several techniques for positioning target objects, such as persons or assets. In FIG. 1, a first and second target object TO1, TO2 are depicted as hands of persons carrying respective signal transceivers (signaling devices) STR1, STR2. The signal transceivers STR1, STR2 are coupled to a communication network NW, such as a WLAN network, which comprises several access points AP1, AP2, AP3, etc. In this exemplary implementation the signal transceivers STR1, STR2, which are associated with the target objects TO1, TO2, observe signal strength from the access points AP1-AP3. The signal transceivers STR1, STR2 periodically, or when their movement stops, transmit observation sets OS1, OS2 via the network NW to a centralized positioning server, called positioning engine PE. Alternatively or additionally, the signal transceivers STR1, STR2 can send signals for positioning, and these signals are observed by the access points AP1-AP3 and relayed to the positioning engine PE.

The respective locations of the target objects respectively influence the observation sets OS1, OS2. The relation of location vs. signal strength from the access points is modeled in a data model DM in a positioning engine PE. The data model DM may indicate a calibrated value for each of several locations in the environment. In some embodiments the data model DM is a probabilistic model which indicates a probability distribution for the signal strength (or other location-dependent physical quantities) for each of several locations, called sample points. A probability distribution provides more information than a single calibrated or expected value and is more robust in cases wherein the observations are ambiguous or contradictory.

In the illustrated example the first signal transceiver STR1 is a small positioning tag. To prolong battery life, the tag STR1 is designed to be active only intermittently. There are several ways to implement such an intermittent transmission of observations. For instance, the tag may be provided with an operation logic which puts the timer on sleep mode for most of the time and wakes up the tag in response to timer alerts or activity detections from a push button or motion sensor. When the tag wakes up, it observes the signal strength or other location-dependent physical quantities and sends the observation(s) via the network NW to the positioning engine PE. Along with the observed value of the location-dependent physical quantities, the tag may also indicate the activity that triggered the sending of the observation. For instance, the person depicted as target object TO1 can press the push button or otherwise indicate an alert condition, which is signaled via the network NW to the positioning engine PE. In an alternative implementation, the alert condition is signaled to another server cooperating with the positioning engine PE. Detection of the alert condition indicates that the tag and the person carrying it should be located as soon as possible.

In some implementations, positioning of the tag STR1 is assisted by the second signal transceiver STR2 which is carried by another person depicted as target object TO2. The second signal transceiver STR2 is depicted as a smartphone or personal digital assistant ("PDA"). A typical PDA has a display and/or loudspeaker/headphone, which is why it can receive current positioning data or explicit motion instructions from the positioning engine and relay such information to its user. Some implementations of the invention may indicate the site of the alerting tag differently, depending on the nature of the signal transceiver carried by the candidate user. If the signal transceiver is a dedicated positioning tag with a small display, the site of the alerting tag may be formatted to fit the small display. Conversely, if the signal transceiver is a smartphone or PDA, the alert-processing server may indicate an optimal route from the candidate's current position to the site of the alerting tag. On the other hand, PDA devices and smartphones have a limited battery life, and they may be dedicated for other tasks, such as phone calls, whereas a dedicated tag is more likely to be available and can use a single disposable primary battery for months or years.

Some positioning systems rely on modeling of at least one location-dependent physical quantity, such as signal strength, at several locations in the environment, called sample points. Although signal strength of transmissions by the access points is a typical example of a location-dependent physical quantity, it is not necessary for the data model DM to know the locations of the access points, so long as the locations of the sample points are known. Some positioning systems may rely on physical quantities other than signal strength. Yet other positioning systems are based on short-range transmissions, such as infrared, Bluetooth or microwave radiation. If communication or detection is possible between a short-range transmitter and sender, one of which is the signal transceiver to be located, the signal transceiver and its associated target object are within range of the short-range transmitter. Such techniques suffice to determine a room where the signal transceiver and its associated target object are located.

In some implementations positioning may be enhanced by utilizing information which is based on observations from one or more positioning-assisting signals, one of which is denoted by reference sign PAS. The positioning-assisting signal PAS is sent by one signal transceiver, eg STR2, and received by another one, eg STR1. Neither the origin nor the destination of the positioning-assisting signal PAS is indicated by the data model or otherwise known a priori. Positioning on the basis of signals between two mobile signal transceivers is based on the somewhat surprising discovery that although neither the origin nor the destination of the positioning-assisting signal is known a priori, an observation of the positioning-assisting signal nevertheless provides useful information which is not properly utilized in prior art positioning systems. This is depicted as the third observation set OS3 which is based on the positioning-assisting signal PAS and is an example of a positioning-assisting observation set. To that end the positioning engine PE may be operatively coupled to a signal propagation model PM which indicates a signal value probability distribution as a function of a distance travelled by the signal. The signal propagation model may also take into account obstacles between the signal's originating and terminating locations in the environment. This information can be used to derive an additional location probability distribution, which can be used to resolve ambiguities regarding either target object's location. The positioning engine PE may comprise or be coupled with a user interface UI and or database DB. For instance, the positioning engine PE may output current location estimates, search statistics or the like on the display of the user interface UI. Alternatively or additionally the positioning engine PE may store observations, locations estimates and/or motion histories in the database DB.

The positioning engine may employ one or more tables which indicate various associations. An association table AT links target objects to their associated and co-located transceivers. An optional device model table DMT associates signal transceivers with respective device models that compensate for the differences between different signaling devices' observations of signal quality parameters. The positioning engine or its operator may select among the multiple device models a specific device model for each specific signal transceiver. Device models are described in more detail in commonly-owned patent application WO2004/008796. The techniques described in WO2004/008796 can be used to that compensate for the differences between different signaling devices' observations of the any of the observations OS1 to OS3. The positioning engine may also employ a motion model table MMT to indicate a motion model for each target object based on the target object's motion characteristics, as described in commonly-owned patent application EP 1796419. The motion models may be used to further resolve ambiguities by excluding impossible or highly improbable locations and transitions. Ambiguities may be resolved further by employing a graph which models the topology of the environment by indicating several nodes which are permissible locations in the environment and several arcs which are permissible transitions between two nodes. Creation and using of graphs is described detail in commonly-owned patent application WO2004/008795.

Figure 2:
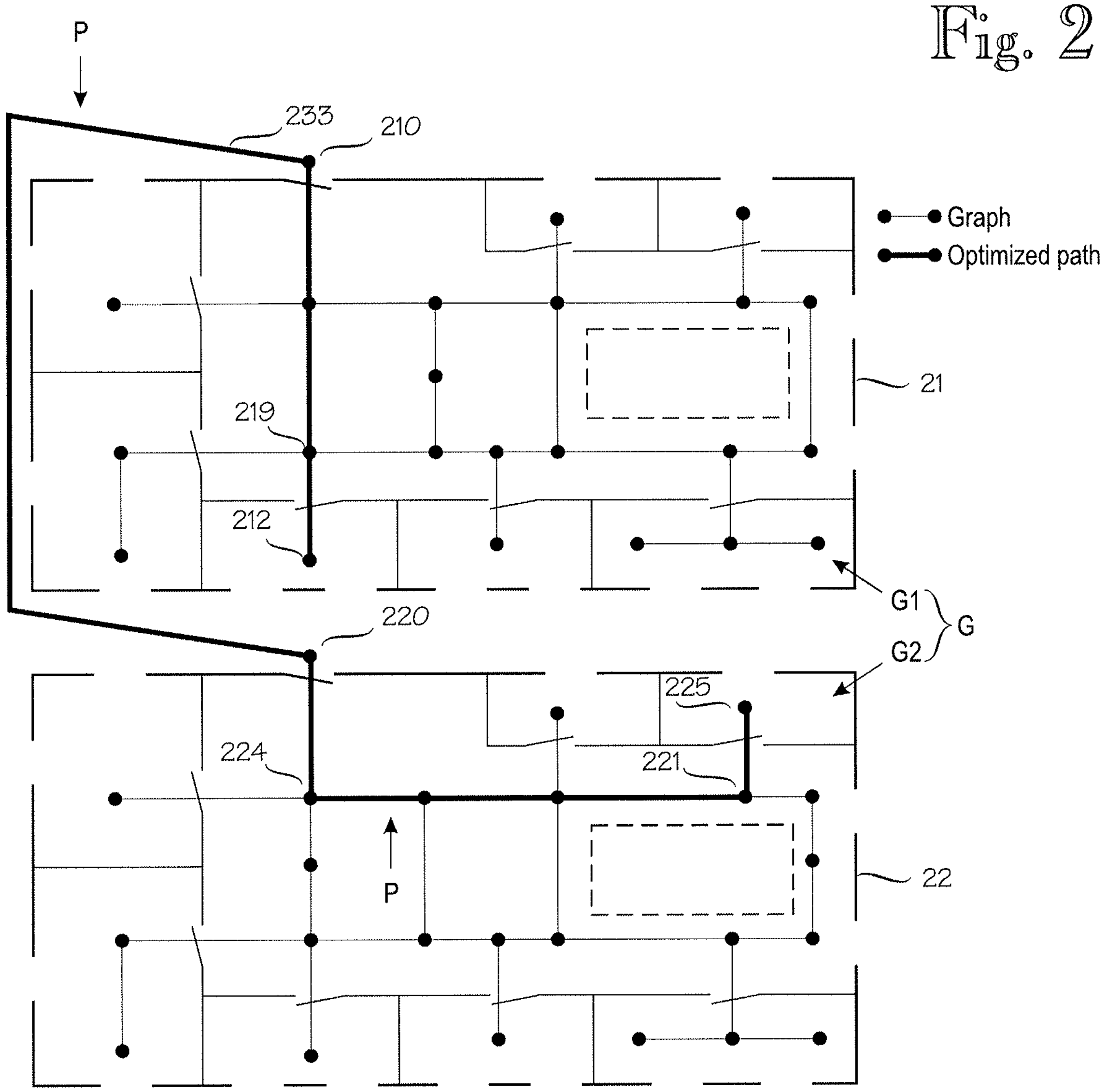
FIG. 2 shows how a topological model of the environment can be used to estimate distances from one target object to another.

FIG. 2 shows how a topological model of the environment can be used to estimate distances from one target object to another. In complex environments there are typically a number of alternative routes, and the positioning engine PE may employ a topological model, shown here as a graph G, to determine an optimal path P from a candidate target object to an alerting target object. The alerting target object is the one that transmitted or triggered transmission of the alert signal. The candidate target objects are target objects from which a subset will be formed, to be notified of the alert condition and to be requested to give assistance.

The optimal path P can be used for either or both of two purposes. For instance, the optimal path P can be used to determine the target objects able to reach the site of the alert as quickly as possible. Alternatively or additionally, the optimal path P can be used to guide a target object to the alert site. In cases wherein the alerting target object is a person, the alert condition and the optimal path P is typically indicated to a person. In cases wherein the alerting target object is fire sensor or another hazard sensor, the alert condition and, optionally, the optimal path P may be indicated to a robot.

As a concrete example, assume that the environment is a hospital, the target device is carried by a doctor who is at node (room) 212 and the doctor is urgently needed at node 225. FIG. 2 shows the full graph G, consisting of subgraphs G1 and G2 for each of the two floors, in order to show how the optimal path P is constructed from arcs of the graph. However, the full graph G is preferably not shown to the doctor. Instead, only the optimal path P, via nodes 212-219-

210-220-224-221-225, is shown. Because a typical target device, such as a smartphone, has a small display, the optimal path P and the underlying floor plan are preferably shown in parts, in response to the target device's detected location. At first, the path portion 212-219-210 on the first floor may be shown, with the underlying portions of the floor plan 21. When the target device approaches the stairs or lift 233, that portion is shown, and when it approaches the entry node 220 to the second floor 22, the remaining part 220-224-221-225 is shown. Thus not only do the graph nodes serve as quantified locations but also selected arcs of the graph can be combined to an optimal path from the target device's detected location to its desired location.

The term 'optimal' does not necessarily mean that the path is indeed optimal but that it is the result of some optimization process (that may or may not be perfect). As is well known, some path optimization problems are very complex and cannot be solved in a reasonable time. In addition, the topological model may not perfectly reflect the environment or indicate attainable speeds at every location. For instance, it is not possible to accurately predict speeds attainable by using elevators. In order to alleviate this residual problem, the positioning engine may record motion histories of various target objects and learn from actually attained speeds between various locations of the environment. The path can be optimized, for example, by minimizing some cost parameter of the path, such as length, time or energy, either singly or in various weighted combinations. For alert conditions, the expected time from the candidate target object's start position to the alert site is obviously the most significant cost parameter.

Figure 3:
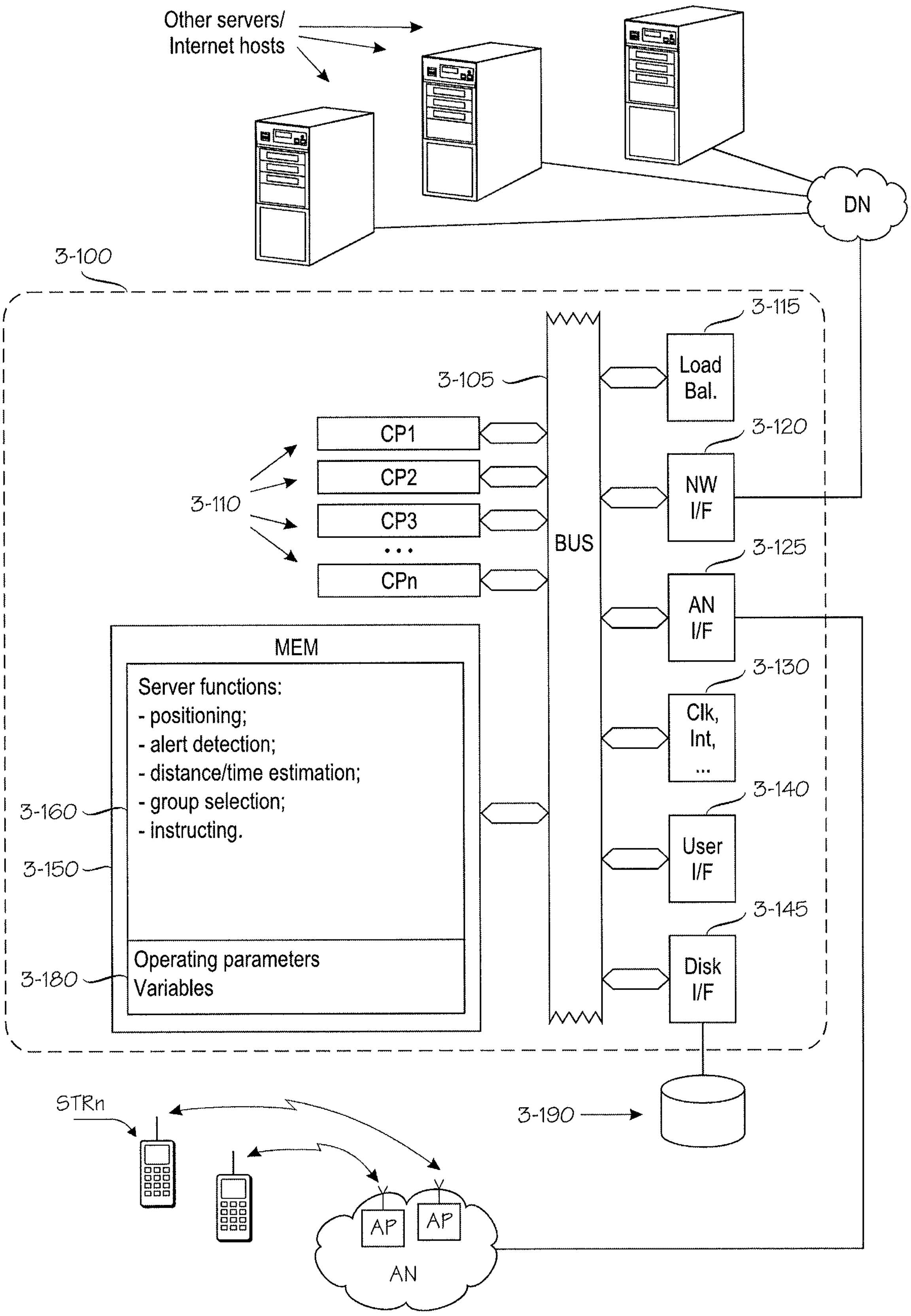
FIG. 3 schematically shows an exemplary block diagram for the various information processing servers.

FIG. 3 schematically shows an exemplary block diagram for the various information processing described earlier. For instance, such a server architecture, generally denoted by reference numeral 3-100, can be used to implement the positioning engine PE and additional servers in implementations wherein the inventive functionality is distributed among multiple servers. The two major functional blocks of the database server system SS are a server computer 3-100 and a storage system 3-190. The server computer 3-100 comprises one or more central processing units CP1 . . . CPn, generally denoted by reference numeral 3-110. Embodiments comprising multiple processing units 3-110 are preferably provided with a load balancing unit 3-115 that balances processing load among the multiple processing units 3-110. The multiple processing units 3-110 may be implemented as separate processor components or as physical processor cores or virtual processors within a single component case. The server computer 3-100 further comprises a network interface 3-120 for communicating with various data networks, which are generally denoted by reference sign DN. The data networks DN may include local-area networks, such as an Ethernet network, and/or wide-area networks, such as the internet. Assuming that the server computer 3-100 acts as a positioning engine 100, it may serve one or more service-specific systems 122 via the data networks DN. Reference numeral 3-125 denotes an access network interface, through which the server computer 3-100 may communicate with various access networks AN, which in turn serve the various signal transceivers, such as smartphones and dedicated positioning tags.

The server computer 3-100 of the present embodiment may also comprise a local user interface 3-140. Depending on implementation, the user interface 3-140 may comprise local input-output circuitry for a local user interface, such as a keyboard, mouse and display (not shown). Alternatively or additionally, management of the server computer 3-100 may be implemented remotely, by utilizing the network interface 3-120 and any internet-enabled terminal that provides a user interface. The nature of the user interface depends on which kind of computer is used to implement the server computer 3-100. If the server computer 3-100 is a dedicated computer, it may not need a local user interface, and the server computer 3-100 may be managed remotely, such as from a web browser over the internet, for example. Such remote management may be accomplished via the same network interface 3-120 that the server computer utilizes for traffic between itself and the client terminals.

The server computer 3-100 also comprises memory 3-150 for storing program instructions, operating parameters and variables. Reference numeral 3-160 denotes a program suite for the server computer 3-100.

The server computer 3-100 also comprises circuitry for various clocks, interrupts and the like, and these are generally depicted by reference numeral 3-130. The server computer 3-100 further comprises a storage interface 3-145 to the storage system 3-190. When the server computer 3-100 is switched off, the storage system 3-190 may store the software that implements the processing functions, and on power-up, the software is read into semiconductor memory 3-150. The storage system 3-190 also retains operating and variables over power-off periods. The various elements 3-110 through 3-150 intercommunicate via a bus 3-105, which carries address signals, data signals and control signals, as is well known to those skilled in the art.

The inventive techniques may be implemented in the server computer 3-100 as follows. The program suite 3-160 comprises program code instructions for instructing the set of processors 3-110 to execute the functions of the inventive method, wherein the functions include performing the alerting and/or positioning features according of the invention and/or its embodiments.

Figure 4:
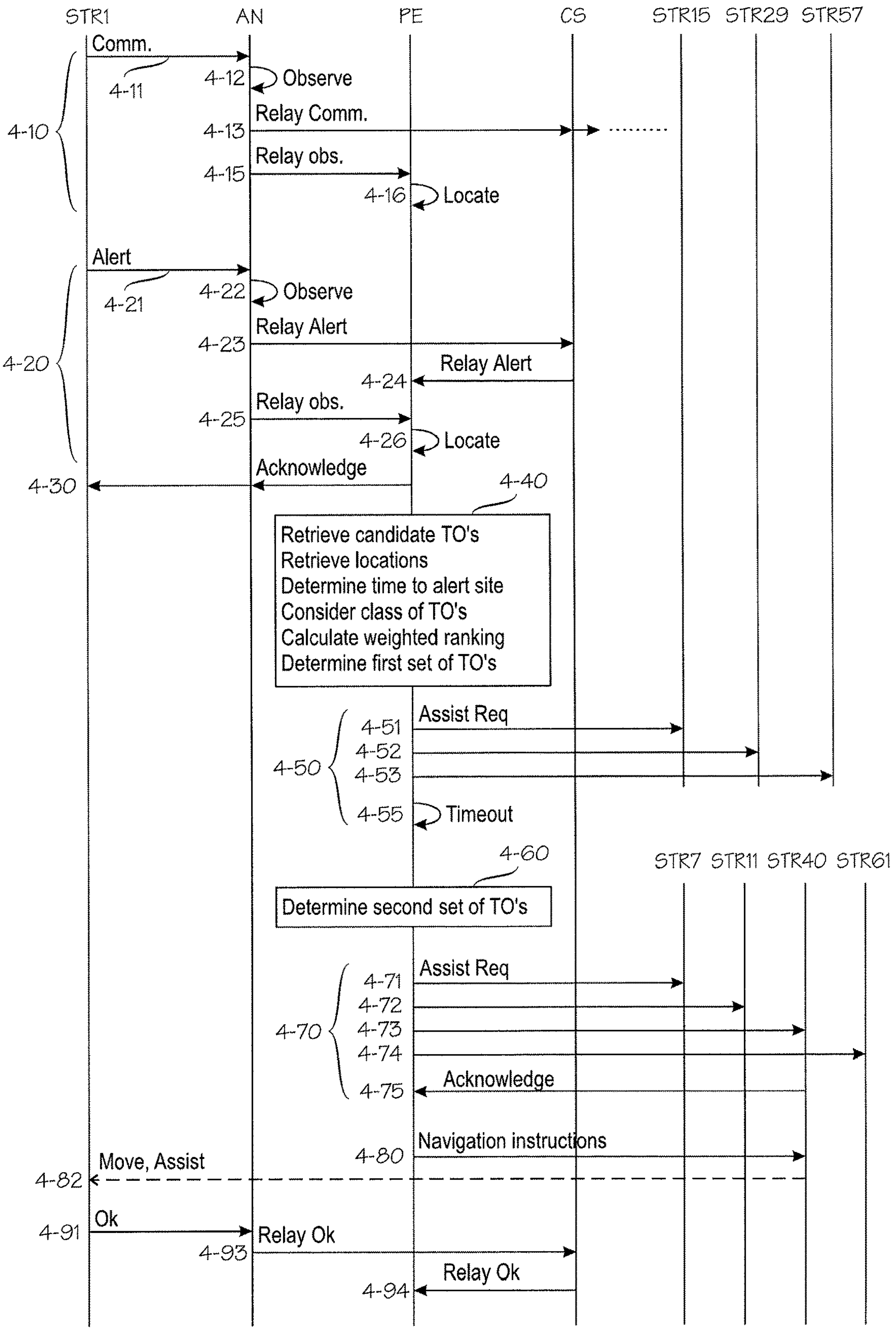
FIG. 4 is a signaling diagram illustrating a hypothetical set of events relating to an embodiment of the invention.

FIG. 4 is a signaling diagram illustrating a hypothetical set of events relating to an embodiment of the invention. In FIG. 4, STRn, wherein n is a number, denotes various signal transceivers which are co-located with the target objects, such as persons and/or assets. Automatic hazard detectors are an illustrative example of assets that may send alert signals. STR1 denotes the signal transceiver that sends an alert signal, while the remaining signal transceivers STRn, wherein $n \neq 1$, are signal transceivers of candidate target objects that may be requested to give assistance.

Reference number 4-10 denotes a series of acts used in maintaining position data with respect to signal transceivers. In FIG. 4 the acts 4-10 are shown in connection with STR1 but the acts may be repeated similarly for all transceivers. In step 4-11, the transceiver STR1 sends a communication via the access network AN. In step 4-12, an access point in the access network AN makes an observation of the communication 4-11. Typically but non-restrictively the observation comprises measurement of signal strength and/or quality. In step 4-13 the access network AN relays contents of the communication to its intended destination, which is here shown as communication server CS, which may forward the communication still further. So long as the nature of the communication is not related to an alert condition, the communication is transparent to the present invention. For the purposes of the invention, what matters is that the communication is used to derive positioning information with respect to the transceiver STR1. In step 4-15 the access network AN relays the observation to the positioning engine PE, which uses it to locate or update the location estimate of the transceiver STR1 in step 4-16. The series of acts 4-10 are repeated several times for all signal transceivers located by the positioning engine PE.

Reference number 4-20 denotes a series of acts relating to an alert message from signal transceiver STR1. In step 4-21 the transceiver STR1 sends an alert signal. In steps 4-23 and 4-24 the alert message is relayed via the exemplary communication server CS to the positioning engine PE (or a separate server operationally coupled to the database(s) maintained by the positioning engine PE). In steps 4-23 and 4-25 the alert signal may be observed and the observation may be relayed to the positioning engine, as was done in the case of the normal communication earlier. In step 4-26 the positioning engine PE locates (estimates the position of) the alerting signal transceiver STR1. In step 4-30 the positioning engine PE sends an acknowledgment to the alerting signal transceiver STR1.

Reference number 4-40 denotes a series of acts used in determination of a first set of target objects to which an assist request message will be sent. These acts include retrieving of other (candidate) target objects from a database in which data for the target objects is stored, retrieving locations of the other target objects, determining the time for the target objects to reach the site of the alerting target object from the site of the other target objects. Optionally, the positioning engine PE (or another cooperating server) may consider the class of the other target objects, such as security, doctor, nurse, etc. The positioning engine PE then calculates a weighted ranking of the other target objects and forms a first set of target objects from a number of the highest-ranking target objects.

Reference number 4-50 denotes a series of steps in which the positioning engine PE sends an assist request message to the first set of target objects. In this example, the first set comprises target objects associated and co-located with signal transceivers STR15, STR29 and STR57 (steps 4-51 . . . 4-53). In this example, the positioning engine PE sets a watchdog timer when the assist request message is sent to the first set of target objects, and the watchdog timer expires in step 4-55 because an acknowledgment was not received from the first set of target objects.

In step 4-60 the positioning engine PE forms a second set of target objects. In this example the first set comprised target objects with the first through third rankings. In this hypothetical scenario, the second set is larger than the first set and comprises target objects with the fourth through seventh rankings. They are denoted as STR7, STR11, STR40 and STR61. Assist request messages to these are sent in steps 4-71 . . . 4-74. In step 4-75, the positioning engine PE receives an acknowledgment from STR11. In step 4-80 the positioning engine PE sends navigation instructions from the site of STR11 to the site of STR1. As stated in connection with FIG. 2, the navigation instructions lead the user of STR11 along an optimized path P, which may be sent to the STR11 in multiple phases as the user of STR11 follows the optimized path towards STR1. Dashed arrow 4-82 depicts steps wherein the user of STR11 moves to the site of STR1 and gives assistance. In steps 4-91 through 4-94 an Ok message is sent from STR1 (and/or STR11) to the positioning engine PE.

Those skilled in the art will realize that the inventive principle may be modified in various ways without departing from the spirit and scope of the present invention.

REFERENCE DOCUMENTS

1. WO02/054813 discloses methods and equipment for estimating a receiver's location in a wireless telecommunication environment.
2. WO03/102622 discloses techniques for locating a target in a wireless environment. The techniques use a set of submodels of the wireless environment, each submodel indicating a probability distribution for signal values at one or more locations in the wireless environment. The submodels are combined to a probabilistic model of the environment which indicates probability distributions for signal values in the environment.
3. WO2004/008796 discloses a location-determination technique which comprises determining a set of device models that compensate for the differences between different target objects' observations of signal quality parameters and selecting, among the multiple device models, a specific device model for a specific target object.
4. U.S. Pat. No. 7,299,059 (EP1796419) discloses comprehensive techniques for modeling target object movement, including motion models.
5. US2005/197139 (WO2004/008795) discloses location-determination techniques which use a graph that models the topology of the target object's communication environment.
6. US US2005/131635 discloses techniques for determining an error estimate concerning a target device's location. The target moves and communicates in a wireless environment using measurable signals. A model of the wireless environment indicates a probability distribution for signal values at several sample points. The target's location is estimated based on the model and signal observations. Various techniques for error estimation are disclosed.
7. WO2008/065257 discloses various techniques for improving reliability of a prediction system by using context models.

The above reference documents are commonly-owned patent applications the teaching of which is incorporated herein by reference.

The invention claimed is:

1. A method comprising the following acts performed by a data processing apparatus, which comprises or cooperates with a positioning server system configured to manage a database storing respective location estimate for each of several positioning devices and to maintain descriptive information on each of several users, each of whom is associated with a respective positioning device:

receiving one or more alert messages from an alerting positioning device, wherein each alert message conveys identifying information of the alerting positioning device that sent the one or more alert messages;

using the identifying information conveyed in the one or more alert messages to retrieve from the database a location estimate of the alerting positioning device;

determining a first set of other positioning devices in a vicinity of the alerting positioning device; and sending an assist request message to each of the positioning devices in the first set of other positioning devices, wherein the assist request message indicates the location estimate of the alerting positioning device and/or said descriptive information on the user associated with the alerting positioning device.

2. The method according to claim 1, wherein said determination of the first set of positioning devices comprises considering at least one of a set of factors for a number of candidate positioning devices, wherein the set of factors comprises:

an estimated distance and/or an estimated travel time from the location estimate of the candidate positioning device to the location estimate of the alerting positioning device;

a first ranking relating to the user associated with the respective candidate positioning device, wherein the ranking is based on the user's ability to give assistance; and a second ranking relating to the user associated with the alerting positioning device.

3. The method according to claim 2, wherein said considering at least one of the set of factors comprises considering at least two of the set of factors and forming a weighed combination of the considered factors.

4. The method according to claim 3, wherein said forming of the weighed combination comprises using weights which are configurable by an operator or administrator of the data processing apparatus.

5. The method according to claim 1, further comprising determining a second set of other positioning devices in a vicinity of the at least one alerting positioning device and to send a further assist request message to each of the positioning devices in the second set, in response to not receiving an acknowledgment message from a predetermined number of positioning devices in the first set.

6. An apparatus, wherein the apparatus comprises or cooperates with a positioning server system configured to track a respective location estimate for each of several positioning devices and to maintain descriptive information on each of several users, each of whom is associated with a respective positioning device;

wherein the apparatus further comprises:

a memory system for storing program instructions;

a processing system for executing the program instructions;

a database system for storing the respective location estimates for the set of positioning devices; and an alert signal reception system for receiving at least one alert message from one or more alerting positioning devices, wherein each alert message conveys identifying information of the alerting positioning device that sent the at least one alert message;

wherein the apparatus is configured to:

use the identifying information conveyed in the at least one alert message to retrieve from the database system the location estimate for the one or more alerting positioning device; and determine a first set of other positioning devices in a vicinity of the at least one alerting positioning device and to send an assist request message to each of the positioning devices in the first set of other positioning devices.

7. The apparatus according to claim 6, wherein said determination of the first set of positioning devices comprises determining, for a number of candidate positioning devices, an estimated travel time from the location estimate of the candidate positioning device to the location estimate of the alerting positioning device.

8. The apparatus according to claim 7, wherein said determination of the estimated travel time comprises determining an estimated distance from the location estimate of the candidate positioning device to the location estimate of the alerting positioning device, and weighing the estimated distance with an estimated speed of the user associated with the respective candidate positioning device.

9. The apparatus according to claim 6, wherein said determination of the first set of positioning devices further comprises determining an assistance-giving ability of the user associated with the respective candidate positioning device.

10. The apparatus according to claim 6, wherein the apparatus is further configured to determine a second set of other positioning devices in a vicinity of the at least one alerting positioning device and to send a further assist request message to each of the positioning devices in the second set, in response to not receiving an acknowledgment message from a predetermined number of positioning devices in the first set.

11. A method comprising the following acts performed by a data processing apparatus, which comprises or cooperates with a positioning server system configured to manage a database storing respective location estimates for each of several mobile positioning devices and to maintain descriptive information on each of several users, each of whom is associated with a respective mobile positioning device:

receiving one or more alert messages from an alerting mobile positioning device, wherein each alert message conveys identifying information of the alerting mobile positioning device that sent the one or more alert messages;

using the identifying information conveyed in the one or more alert messages to retrieve from the database a location estimate of the alerting mobile positioning device;

determining a first set of other mobile positioning devices in a vicinity of the alerting mobile positioning device; and sending an assist request message to each of the mobile positioning devices in the first set of other mobile positioning devices.

* * * * *